(12) United States Patent　(10) Patent No.: US 11,970,353 B2
Hornick et al.　(45) Date of Patent: Apr. 30, 2024

(54) GRIPPER ASSEMBLY, APPARATUS FOR RECOVERING A LAYOUT FROM A SHEET MATERIAL AND METHOD FOR SEPARATING A LAYOUT FROM WASTE OF A SHEET MATERIAL

(71) Applicant: BOBST MEX SA, Mex (CH)

(72) Inventors: Paul Hornick, Vufflens-le-Château (CH); Yannick Roulin, Cossonay-Ville (CH); Roberto Valterio, Ollon (CH)

(73) Assignee: BOBST MEX SA, Mex (CH)

( * ) Notice: Subject to any disclaimer, the term of this patent is extended or adjusted under 35 U.S.C. 154(b) by 45 days.

(21) Appl. No.: 17/593,290

(22) PCT Filed: Mar. 17, 2020

(86) PCT No.: PCT/EP2020/025134
§ 371 (c)(1),
(2) Date: Sep. 15, 2021

(87) PCT Pub. No.: WO2020/187452
PCT Pub. Date: Sep. 24, 2020

(65) Prior Publication Data
US 2022/0194730 A1　Jun. 23, 2022

(30) Foreign Application Priority Data
Mar. 18, 2019　(EP) .................... 19020133

(51) Int. Cl.
*B65H 29/38*　(2006.01)
*B25J 9/00*　(2006.01)
(Continued)

(52) U.S. Cl.
CPC ............ *B65H 29/38* (2013.01); *B25J 9/0093* (2013.01); *B25J 15/0625* (2013.01); *B65H 29/242* (2013.01)

(58) Field of Classification Search
CPC .......... B65H 2301/4472; B65H 29/241; B65H 2406/34; B65H 2406/33;
(Continued)

(56) References Cited

U.S. PATENT DOCUMENTS

| 4,881,770 A | * | 11/1989 | Marzinotto | B65G 47/91 |
| | | | | 294/186 |
| 5,450,333 A | * | 9/1995 | Minami | B26D 5/005 |
| | | | | 83/100 |

(Continued)

FOREIGN PATENT DOCUMENTS

| CN | 103221190 A | 7/2013 |
| CN | 106573693 A | 4/2017 |

(Continued)

OTHER PUBLICATIONS

International Search Report dated Jul. 2, 2020 in corresponding International Application No. PCT/EP2020/025134 (2 pages).

*Primary Examiner* — Gregory W Adams
(74) *Attorney, Agent, or Firm* — Bookoff McAndrews, PLLC (57) ABSTRACT

A gripper assembly for recovering a layout (22) from a sheet material (12) is presented. It comprises a vacuum gripper (26) with a gripper body (32) on which an array of air flow openings (34a, 34b) is arranged. Air flow openings (34a) associated with one or more blanks (20) of the layout (22) are selectively open and air flow openings (34b) associated to waste (28) of the sheet material (12) are selectively closed. Additionally, an apparatus for recovering a layout (22) from a sheet material (12) comprising such a gripper assembly is described. Furthermore, a method for separating a layout (22) from waste (28) of a sheet material (12) is explained.

18 Claims, 7 Drawing Sheets

(51) Int. Cl.
*B25J 15/06* (2006.01)
*B65H 29/24* (2006.01)

(58) Field of Classification Search
CPC ............ B65H 2406/3632; B65H 29/38; B65H 29/242; B25J 15/0616; B25J 15/0625; B25J 15/0633; B25J 15/0641; B25J 15/065; B25J 15/0658; B25J 15/0666; B25J 15/0675; B25J 15/0683; B25J 15/0691; B25J 9/0093
See application file for complete search history.

(56) References Cited

U.S. PATENT DOCUMENTS

| | | | | |
|---|---|---|---|---|
| 5,883,357 | A * | 3/1999 | Newman | B32B 38/18 414/744.5 |
| 6,139,079 | A * | 10/2000 | Patel | H01L 21/4846 118/213 |
| 8,876,100 | B1 * | 11/2014 | Herrmann | B25J 9/0093 271/302 |
| 9,573,280 | B2 * | 2/2017 | Harter | B25J 15/0691 |
| 2001/0003936 | A1 * | 6/2001 | Song | B26D 7/1863 83/25 |
| 2007/0082801 | A1 * | 4/2007 | Kauppila | B65H 45/162 493/435 |
| 2009/0263218 | A1 * | 10/2009 | Katsuyama | B65H 35/00 414/225.01 |
| 2013/0127194 | A1 * | 5/2013 | Regan | B25B 11/007 294/188 |
| 2013/0292226 | A1 | 11/2013 | Ben-David et al. | |
| 2017/0165859 | A1 * | 6/2017 | Kropf | B26D 7/015 |

FOREIGN PATENT DOCUMENTS

| | | |
|---|---|---|
| DE | 102008025468 B3 | 6/2009 |
| EP | 1074354 A1 | 2/2001 |
| JP | 2008007254 A | 1/2008 |
| JP | 2010005769 A | 1/2010 |
| JP | 2017-524567 | 8/2017 |
| KR | 10-2002-0034098 A | 5/2002 |
| KR | 10-2012-0119263 A | 10/2012 |
| TW | I638759 B | 10/2018 |
| TW | 201906699 A | 2/2019 |
| WO | 2009152900 A2 | 12/2009 |

* cited by examiner

GRIPPER ASSEMBLY, APPARATUS FOR RECOVERING A LAYOUT FROM A SHEET MATERIAL AND METHOD FOR SEPARATING A LAYOUT FROM WASTE OF A SHEET MATERIAL

CROSS-REFERENCE TO RELATED APPLICATION(S)

This application is a National Stage under 35 U.S.C. § 371 of International Application No. PCT/EP2020/025134, filed Mar. 17, 2020, which claims priority to European Patent Application No. 19020133.5, filed Mar. 18, 2019, the contents of all of which are incorporated by reference in their entirety.

The invention relates to a gripper assembly for recovering a layout from a sheet material, especially from paper or cardboard, comprising a conveyor unit for providing the sheet material and a vacuum gripper with a gripper body on which an array of air flow openings is arranged, wherein each opening is adapted to seize at least a portion of the sheet material by applying a vacuum force thereto.

Furthermore, the invention relates to an apparatus for recovering a layout from a sheet material, especially from paper or cardboard, comprising a gripper assembly of the type mentioned above, wherein the vacuum gripper of the gripper assembly is connected to a manipulation unit, and a layout storage unit on which one or more blanks of the layout recovered from the sheet material may be positioned.

Additionally, the invention relates to a method for separating a layout from waste of a sheet material, especially from paper or cardboard.

In production lines for products made from paper or cardboard it is usual to provide a sheet material in the form of single sheets or web. This sheet material is then cut, e.g. on a laser cutting machine, but not every portion of the sheet material is needed for the final product. It is therefore necessary to separate the portions needed for the final product, the so-called layout, from the portions not needed for the final product, the so-called waste.

More precisely, the layout is defined as the usable part of the sheet material, which may generally be composed of multiple blanks. The separation process is also called stripping or blanking.

Since paper products and cardboard products are increasingly individualized, customers require the production of a great variety of paper or cardboard products, whereas the number of items to be produced per variety is comparatively low.

Hence, manufacturers of paper or cardboard products have to be in a position to profitably produce small batches or small lot sizes of paper or cardboard products. In other words, short runs have to be profitable.

As far as the corresponding production machines, gripper assemblies and apparatus are concerned, short set-up times are required for preparing the machine for a new or subsequent production batch. In between the production of two different batches, changeover times shall be as short as possible.

While these requirements have generally been met in the fields of paper or cardboard cutting by using laser-cutting machines, set-up times and changeover times in stripping or blanking are still comparatively high.

Also costs for toolings of known stripping or blanking apparatus are comparatively high as the toolings need to be specifically adapted to the layout to be stripped. An alternative to such toolings would be manual operations, which do not offer a significant advantage in terms of costs.

It is therefore an object of the present invention to provide a gripper assembly, an apparatus for recovering a layout from a sheet material, and a corresponding method, which are suitable for small batch production, i.e. which offer short set-up times and short change over times. This also implies that the small batch production shall be realized at competitive, i.e. low, costs.

The problem is solved by a gripper assembly according to claim 1. The conveyor unit having a vacuum system allows for safely transporting sheet material of any shape and size. Additionally, such a conveyor unit is able to provide sheet material to the associated vacuum gripper in a precise manner. Furthermore, the conveyor unit may be smoothly integrated in an existing or planned material flow. As far as the vacuum gripper is concerned, the air flow openings associated with the layout will seize the one or more blanks of the layout, whereas the air flow openings associated with waste will not cooperate therewith. To this end the determination of air flow openings being associated with the layout and air flow openings being associated with waste is an active process, which takes place before the actual gripping operation starts. Thereby, the layout can easily be separated from waste. The vacuum gripper is specifically adapted to the geometry of the layout to be separated from corresponding waste by selectively opening the corresponding air flow openings and selectively closing all air flow openings associated with waste. This can be done easily and quickly, which leads to short set-up times and short changeover times. Consequently, such a vacuum gripper is well suitable for producing individualized paper or cardboard products in small quantities at reasonable costs.

The gripper assembly according to the present invention may be used for sheet material, which is provided in the form of single sheets or web. The effects and advantages described above can be achieved for both alternatives. It is preferred to use the vacuum gripper for sheet material having the form of single sheets. Such a material may be designated cut sheet material.

Usually, the sheet material to be processed by the gripper assembly is processed in a cutting machine beforehand, where the boundaries between the layout and the waste are cut. In other words, the gripper assembly is arranged downstream the cutting machine with respect to a travelling direction of the sheet material. The cutting machine is preferably a laser-cutting machine.

In this context, the conveyor unit of the gripper assembly may be shared with the laser-cutting machine, i.e. the same conveyor unit is used in the cutting machine and the gripper assembly.

Apart from paper or cardboard the vacuum gripper is also suitable for the manipulation of sheet material made from polymer, medium-density fiberboards or any other flexible material.

A distance between neighboring air flow openings or a mesh size of the array may be chosen to be small in comparison to the geometric elements of the layout. Consequently also small, slender or odd shaped geometric elements of the layout may be seized by the vacuum gripper in a reliable way. More precisely, each geometric element is seized by a comparatively high number of air flow openings. Additionally, a small mesh size may increase a vacuum force being applicable to a certain area of the sheet material. Therefore, relatively heavy or thick sheet material may be processed.

Preferably, the array of air flow openings covers a predefined maximum format of sheet material to be manipulated by the vacuum gripper. Consequently, by selectively closing and opening the air flow openings as described above, any kind of layout geometry may be separated from the remaining waste as long as it fits within the outer boundaries of the maximum format. Such a vacuum gripper is apt to be used for a wide variety of cardboard or paper products.

If the sheet material is provided in the form of single sheets, the maximum format of the sheet material corresponds to the maximum format of single sheets to be manipulated by the vacuum gripper.

According to an embodiment of the invention the array of air flow openings is arranged on a gripping side of the gripper body, wherein the gripping side is equipped with a mask, which selectively covers air flow openings being associated with waste and selectively does not interfere with air flow openings associated with one or more blanks of the layout. This means that cut-out areas are provided on the mask, which do not cover air flow openings. The cut-out areas substantially correspond to the geometry of the one or more blanks of the layout. The remaining areas of the mask, thus the areas corresponding to waste, selectively cover, i.e. close, the corresponding air flow openings. In this context "not interfering" means that the seizing functionality of the vacuum gripper is maintained with respect to these openings. Consequently, vacuum is applied to the blanks only, not to waste. For layouts of different geometry, different masks may be provided. Thus, in a highly individualized production a suitable mask is provided for every job. When preparing the gripper for a subsequent job just the mask has to be changed, which preferably is done without the use of tools. This process can be performed very quickly, which leads to low set-up times and low changeover times. The conveyor unit does not need to be adapted when changing jobs. It is universally suitable for all kind of jobs to be processed by the gripper assembly.

The masks may be produced from a sheet material, especially from a sheet of cardboard or plastics material. Starting from a solid sheet, a laser-cutting machine may be used to produce a mask suitable for a specific job. To this end, the laser-cutting machine can be loaded manually or automatically. In the second case, a robot with a gripper mounted thereto may pick sheets from a pile of raw masks and place them in a cutting area.

Consequently, it is possible that the same cutting machine is used for producing a mask and for processing sheet material which thereafter interacts with a vacuum gripper being equipped with this mask. Thus, no special machines are needed for producing masks.

Also a storage unit for masks may be provided, where masks of different geometry, each being associated with a certain type of layout, may be stored while they are not used on the vacuum gripper.

For changing the mask of a vacuum gripper, the gripper may adopt a mounting-position, which is characterized by easy accessibility for an operator. The operator may then change the mask by hand.

Advantageously, the gripping side of the vacuum gripper is magnetic, especially wherein a magnetic cover is attached to the gripping side of the vacuum gripper. Such a magnetic cover, which may have the form of a magnetic sheet, does not interfere with any of the air flow openings. Consequently, it does not hinder the functionality of the vacuum gripper. The magnetic cover may be glued to the gripping side of the gripper or attached thereto by any other suitable means. Such a gripper offers the possibility of attaching the mask thereto by magnetic means. This allows for changing the mask easily and quickly.

In this context, the mask may be positioned between the magnetic side of the vacuum gripper and a magnetic sheet covering the mask on its side opposing the vacuum gripper. Thus, the mask is attached to the gripper body in a reliable manner while still being easily exchangeable. Preferably, holes are provided in the magnetic sheet, which are arranged opposite each of the air flow openings of the gripper. Therefore, the functionality of the vacuum gripper is not inhibited by the magnetic sheet. Advantageously, the mask is made from a non-magnetic material. As an alternative to the magnetic sheet a magnetic grid may be provided covering the mask on its side opposing the vacuum gripper. In both alternatives, i.e. magnetic sheet and magnetic grid, the mask may be exchanged manually as described above.

Alternatively, a semi-automatic change of mask is possible. In this context, the magnetic sheet is stored at a precise location and an operator manually positions the mask to be mounted on the gripper on the magnetic sheet. After having removed the previous mask from the gripper, it is automatically moved to a position vertically above the magnetic sheet such that the latter is magnetically attracted to the gripper. Consequently the mask and the magnetic sheet are mounted to the gripper.

It is also possible to change the mask in a fully automatic way. As a preparatory measure thereof, an operator removes the magnetic sheet and the current mask from the gripper. Subsequently, the new mask is seized by the gripper using the vacuum gripper functionality. This means that the air flow openings associated to waste are used to seize the mask and attach it to the gripper. The magnetic sheet, which again is stored at a precise location, is then mounted to the gripper by moving the gripper to a position vertically above the magnetic sheet such that the latter is magnetically attracted and held on the gripper.

Any time a new or different mask is mounted on the gripper, it has to be assured that the mask is free from contamination, especially free from waste resulting from the production process of the mask. Otherwise small waste particles may get stuck between the magnetic sheet and the vacuum gripper blocking air flow openings in an undesired and uncontrollable way. This has to be avoided.

The risk of contaminating the mask with waste particles is especially high directly after a cutting process, e.g. a laser cutting process, which cuts the mask in accordance with the geometry of a layout to be recovered. In order to clean the mask from waste particles, it can be treated with an air jet separating waste particles from the mask. Alternatively, during the process of cutting the mask, the waste portions of the sheet material from which the mask is cut, may be cut into parts small enough to be sucked through the vacuum chamber of the vacuum gripper without getting stuck. In this case there is no risk of inhibiting the gripper functionality. If the mask is cut on a non-plain conveyor belt, such small waste particles may also fall through or be sucked through the conveyor belt without getting stuck.

The conveyor unit may comprise a plurality of suction openings which are fluidically connected to the vacuum system such that the sheet material may be held on the conveyor unit by sucking air through the suction openings by the vacuum system. Especially a configuration of the suction openings is independent from the size and/or shape of the sheet material to be processed. This also means that the configuration of the suction openings is independent form the size and/or shape of the one or more blanks, i.e. the layout. In other words, the conveyor unit is universally suitable for any kind of sheet material comprising any kind of layout. As a consequence thereof the conveyor unit does not need any modification when adapting the gripper assembly to a new job. Thus, changeover times and corresponding efforts are reduced.

Moreover, the vacuum system is configured such that a vacuum force applied to one or more blanks by the vacuum system is smaller than a vacuum force applied to the one or more blanks by the vacuum gripper. Thus, the vacuum gripper is able to seize and move blanks which are held by the conveyor unit. In other words, the vacuum gripper is able to separate blanks from the conveyor unit.

Additionally, the problem is solved by an apparatus according to claim 8. For such an apparatus the effects and advantages explained for the vacuum gripper apply mutatis mutandis. This means that such an apparatus is able to offer short set-up times and short changeover times and therefore is well suited for the production of individualized paper or cardboard products. Furthermore, such an apparatus is independent of the number of blanks comprised by a layout since multiple blanks may be seized by the vacuum gripper. This results in a shortened overall process time and relatively low costs.

Since the gripper assembly according to the present invention may be used for sheet material, which is provided in the form of single sheets or web, also the apparatus according to the invention may be used for both alternatives.

In the context of such an apparatus, it is preferably not necessary to link the layout and the waste by so-called nick points i.e. small, bridge-like elements of sheet material physically connecting the layout to the waste. In other words nick points are small interruption in the cutting line to generate a bridge between the layout and waste. Consequently, during the process of blanking, it is not necessary to break such nick points. This leads to a high optical quality of the paper or cardboard product since they are free from small projections usually present at the ends of broken nick points.

The use of such an apparatus is especially suitable, when in combination with a laser cutting machine. As explained above, laser cutting machines have the advantage of short set-up times and changeover times. The same is true for the apparatus according to the invention. Consequently, a generally continuous production flow may be established using the laser cutting machine and the apparatus according to the invention. This leads to a high product output per time unit, which is especially the case for so called short runs.

The apparatus may comprise one or more additional vacuum grippers, wherein each additional vacuum gripper is connected to a respective additional manipulation unit. Thus, a plurality of vacuum grippers may be used in parallel to recover the layout from the sheet material. Consequently the process of blanking can be performed with high speed. This leads to a high product output per time unit. The number of vacuum grippers is generally not limited and may be chosen depending on the specific case.

The plurality of vacuum grippers may cooperate with one single conveyor unit and one single sheet storing unit. In this configuration, vacuum grippers and corresponding manipulation units may be arranged on opposing sides or on same side of the conveyor unit, e.g. left and right of a conveyor belt. In doing so, a compact design of the apparatus may be achieved.

According to a variant, at least one of the manipulation unit and the additional manipulation units comprises an industrial robot, which is adapted to manipulate the respective vacuum gripper within a predefined scope of motion. For example a six axis industrial robot arm or a two axis pick and place robot may be used.

The conveyor unit may be directly connected to the product output area of a laser cutting machine such that the sheet material is placed on the conveyor unit without any detour. Also the manipulation units and the one or more vacuum grippers may be adapted to cooperate with a moving conveyor unit. Consequently, the stripping process is performed while the sheet material is moving at constant speed. This leads to short overall processing times.

The blank storage unit can be a stacking unit. This means that the blanks recovered from the sheet material are stacked upon each other. In case the layout comprises more than one blank, the different blanks may be sorted such that blanks of the same geometry or type are stacked upon each other.

Additionally, the problem is solved by a method according to claim 12. Consequently, the process of blanking or stripping may be performed in an easy and quick manner. This enhances the profitability of such a process.

After step c) the blanks can be moved to a blank storage unit, especially a stacking unit or a further conveyor unit. Reference is made to the effects and advantages already explained in connection with the blank storage unit.

As already explained for the gripper assembly and the apparatus, also the method may be performed with sheet material being provided in the form of single sheets or web.

An addition to sheet material being made from paper or cardboard, the method according to the invention is also suitable for treating sheet material made from polymer, medium-density fiberboards or any other flexible material.

In an alternative, the vacuum gripper is positioned over the sheet during step b), wherein the gripper selectively seizes the blanks without cooperating with waste. Thereby, the vacuum gripper can seize the blanks in a precise manner.

Therefore, the method is also suitable for layouts having very small or delicate portions.

The invention will now be explained with reference to several embodiments which are shown in the attached drawings. In the drawings.

Figure 1:
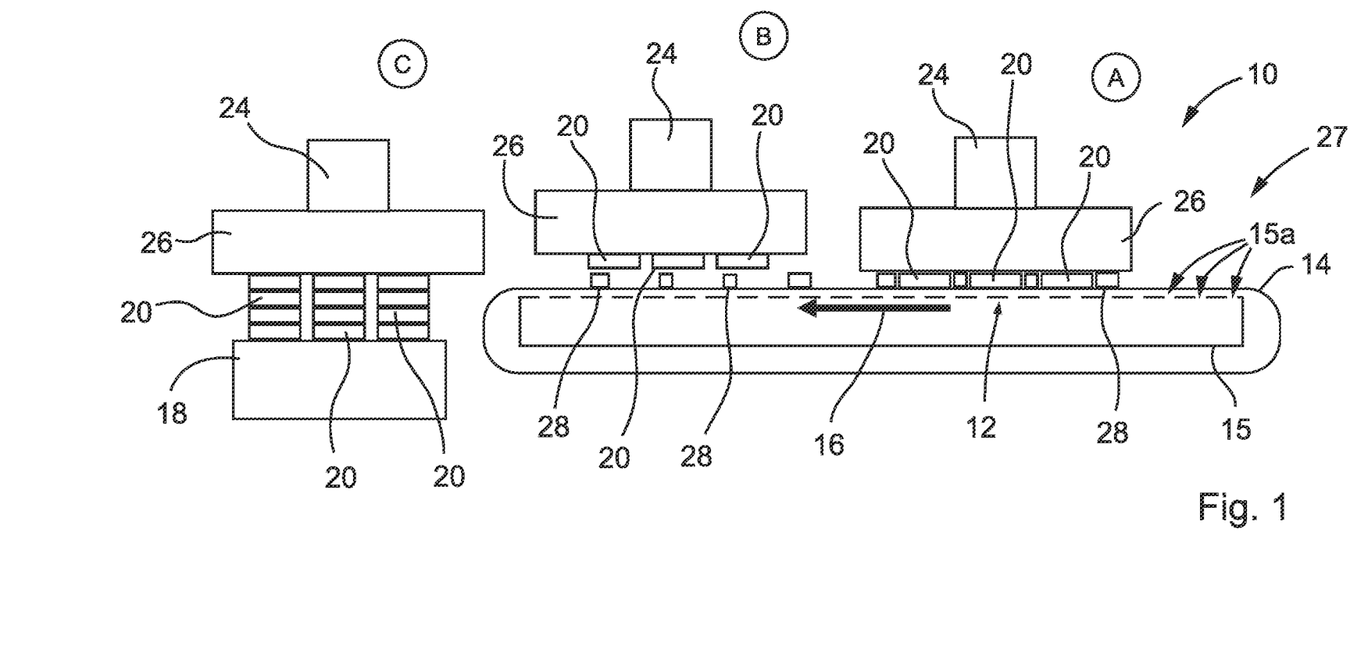
FIG. 1 shows a schematic representation of an apparatus for recovering a layout from a sheet material according to a first embodiment of the invention, wherein also a sheet material is shown.

In FIG. 1 an apparatus 10 for recovering a layout from a sheet material 12 is shown. It cooperates with a sheet material 12 made from paper or cardboard.

The sheet material 12 is provided on a conveyor unit 14, which is a conveyor belt in the example shown. The conveyor belt moves in a direction indicated by arrow 16.

The conveyor unit 14 is equipped with a vacuum system 15 for holding the sheet material 12 on an associated surface of the conveyor unit 14.

To this end the conveyor unit 14 comprises a plurality of suction openings 15a which are fluidically connected to the vacuum system 15 such that the sheet material 12 may be held by sucking air through the suction openings 15a (for better visibility only some of the suction openings 15a are designated by a reference number).

Furthermore, the apparatus 10 comprises a layout storage unit 18 on which one or more blanks 20 of the layout 22 recovered from the sheet material 12 may be positioned. In the present case, the layout storage unit 18 is a so-called stacking unit. This means that the blanks 20 of the layout 22 are stacked upon each other in the layout storage unit 18.

Additionally, the apparatus 10 has a manipulation unit 24 to which a vacuum gripper 26 is connected. The manipulation unit 24 and the corresponding vacuum gripper 26 are shown in three different situations designated A, B and C.

The manipulation unit 24, which is only represented in a schematic way, may comprise an industrial robot, which is adapted to manipulate the respective vacuum gripper 26 within a predefined scope of motion.

The conveyor unit 14 and the vacuum gripper 26 form a gripper assembly 27.

A method for separating the layout 22 from waste 28 of the sheet material 12 may be performed by the apparatus 10. In other words a stripping or blanking method is performed.

Figure 2:
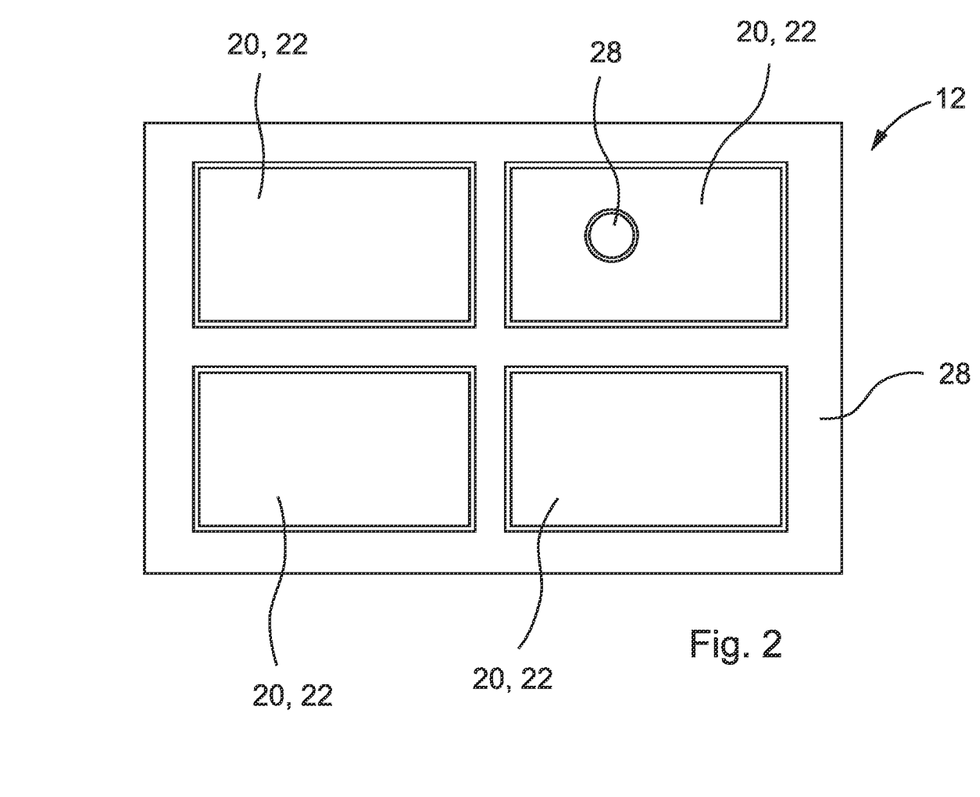
FIG. 2 shows an exemplary sheet material, which may be treated in the apparatus according to FIG. 1.

An exemplified sheet material 12 comprising a layout 22 with four blanks 20 and waste 28 is represented in FIG. 2.

In a first step of the method, the sheet material 12 is provided.

Then, the blanks 20 of the layout 22 are seized with the vacuum gripper 26 (cf. situation A in FIG. 1). In order to do so, the vacuum gripper 26 is positioned over the sheet material 12 and only seizes the layout 22.

The vacuum gripper 26 does not interact with waste 28.

After that, as shown in situation B in FIG. 1, the layout 22 is separated from waste 28. In the present case, the layout 22 is lifted by the vacuum gripper 26, whereas waste 28 remains on the conveyor unit 14.

This is possible since the vacuum system 15 is configured such that a vacuum force applied to the layout 22 by the vacuum system 15 is smaller than a vacuum force applied to the layout 22 by the vacuum gripper 26.

Subsequently, the vacuum gripper 26 is moved into situation C, where it is positioned over the blank storage unit 18. The blanks 20 are stacked on the blank storage unit 18 or on other blanks 20 already being positioned thereon. Thereafter, the interaction between the vacuum gripper 26 and the blanks 20 is terminated and the vacuum gripper 26 may be moved back to situation A by the manipulation unit 24.

Figure 3:
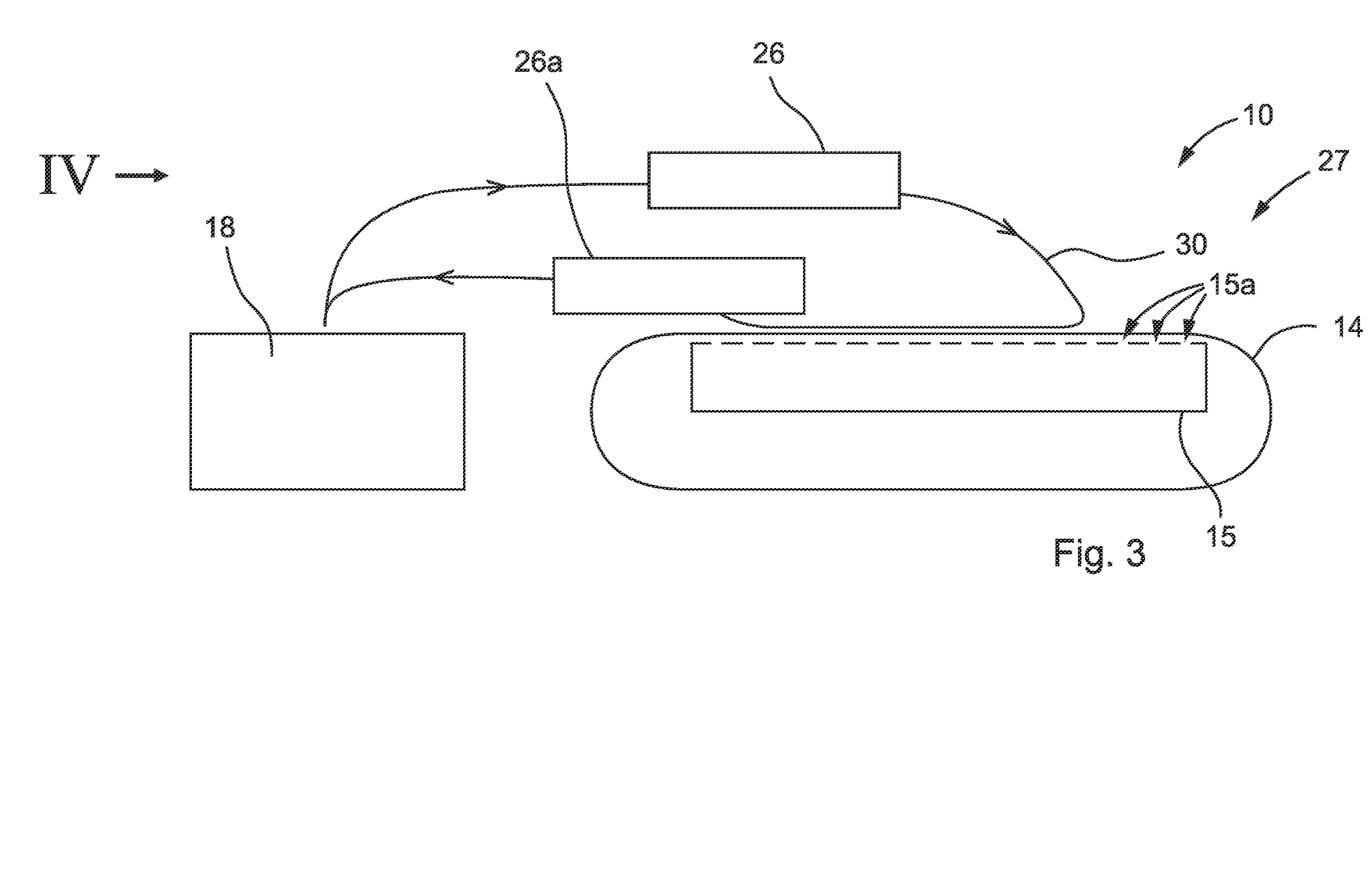
FIG. 3 shows a schematic representation of an apparatus for recovering a layout from a sheet material according to a second embodiment of the invention.
Figure 4:
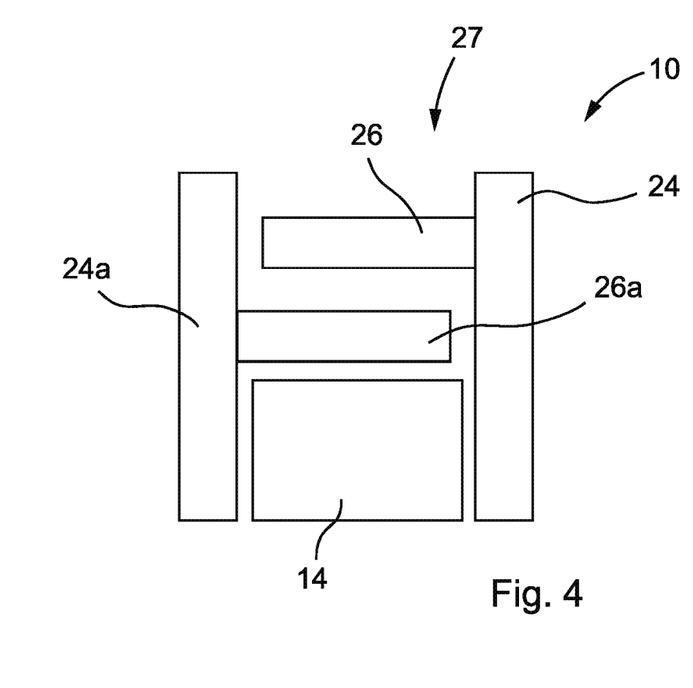
FIG. 4 shows the apparatus according to FIG. 3 seen in a direction IV of FIG. 3.

FIGS. 3 and 4 show a second embodiment of the apparatus 10. This embodiment differs from the embodiment explained above in that it comprises an additional vacuum gripper 26a, which is connected to a respective additional manipulation unit 24a.

Both vacuum grippers 26, 26a cooperate with one single conveyor unit 14 and one single layout storage unit 18.

The vacuum grippers 26, 26a may be operated according to two variants. Either both vacuum grippers 26, 26a cooperate with different portions of one single sheet material 12 in a sense that vacuum gripper 26 seizes a first portion of the layout and places it on the layout storage unit 18 and additional vacuum gripper 26a seizes a remaining second portion of the layout and places it on the layout storage unit 18. Alternatively, every second sheet material 12 being provided by the conveyor unit 14 may be treated by the vacuum gripper 26 and every other sheet material 12 by the additional vacuum gripper 26a.

As shown in FIG. 3, in both variants both vacuum grippers 26, 26a may operate along the same trajectory 30.

As far as the implementation of the method for separating a layout from waste of a sheet material with the second embodiment is concerned, the above explanations apply in an analogous way.

Figure 5:
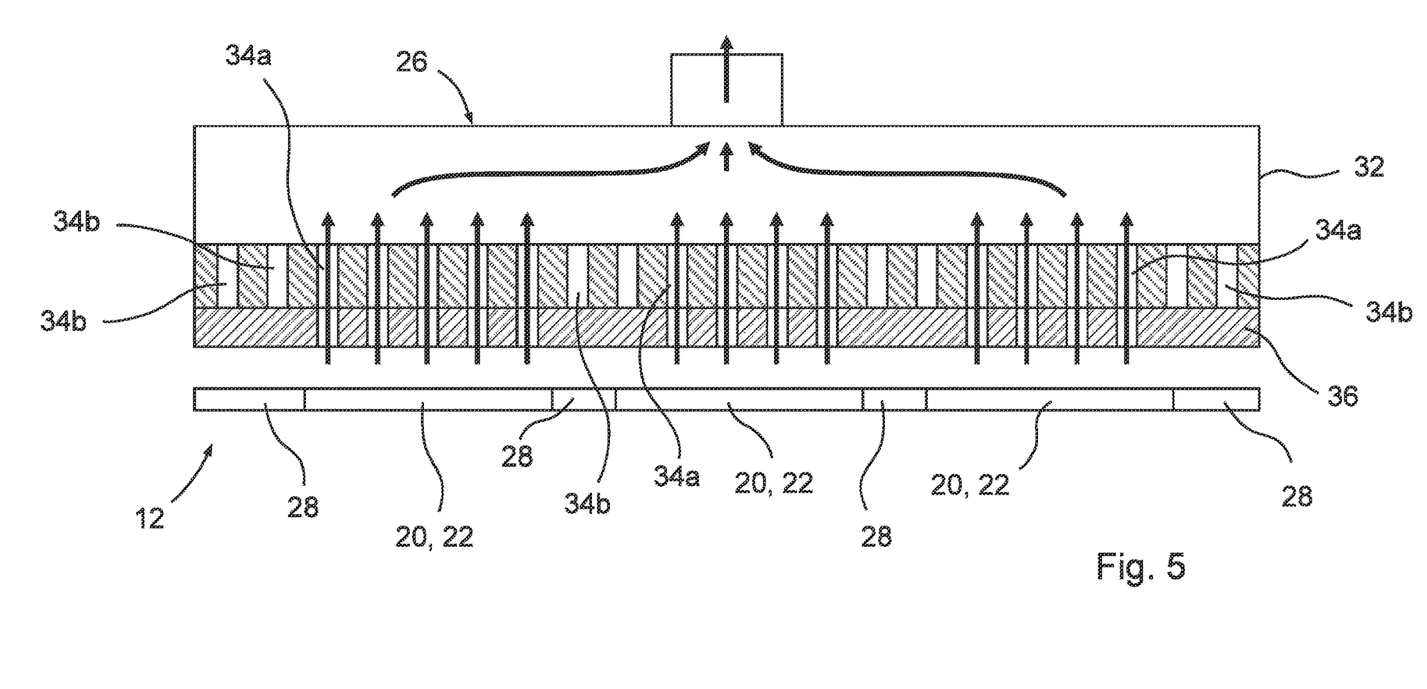
FIG. 5 shows a vacuum gripper of a gripper assembly according to the invention while interacting with a sheet material, FIG. 6 schematically shows the interaction between the sheet material and a mask of a vacuum gripper
Figure 6:
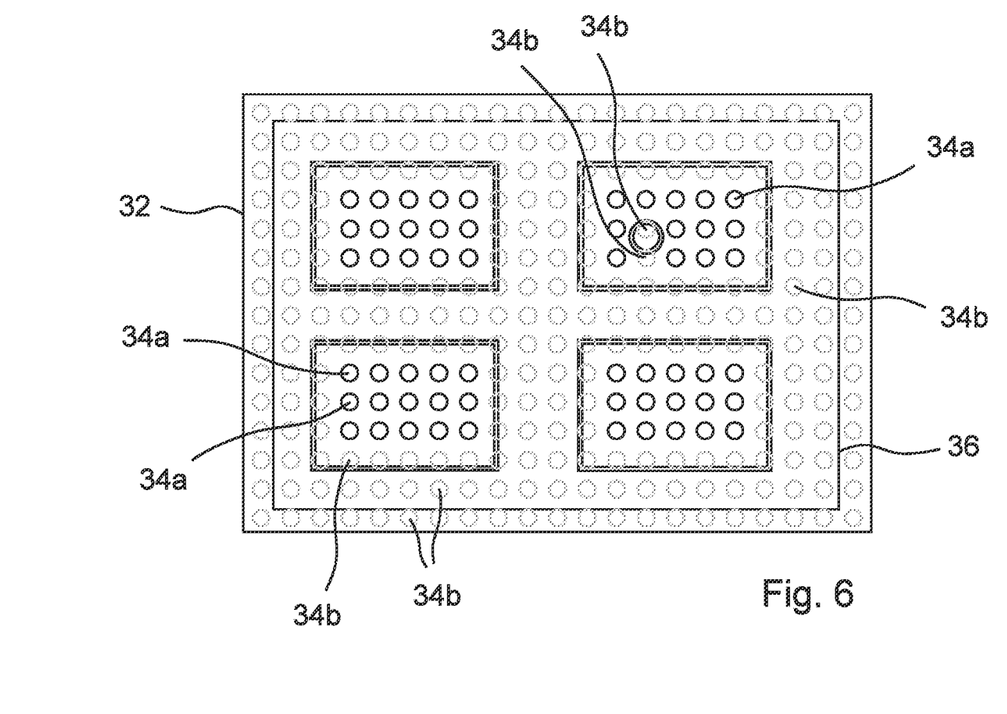
Figure 7:
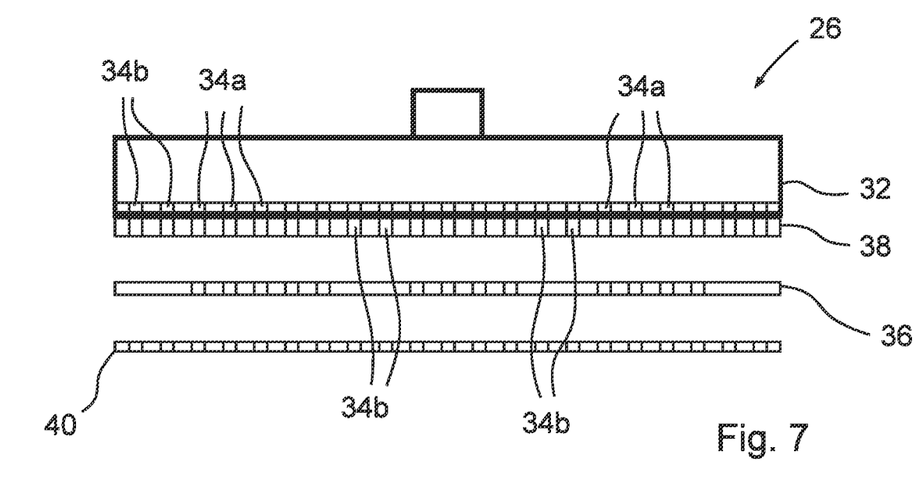
FIG. 7 shows a vacuum gripper of a gripper assembly according to a second embodiment of the invention in an exploded representation.

In FIGS. 5 to 7 the vacuum gripper 26 is shown in detail. Also an exemplary sheet material 12 is shown. As the additional vacuum gripper 26a is identical, a specific explanation thereof will be omitted.

The vacuum gripper 26 comprises a gripper body 32. On a gripping side thereof an array of air flow openings 34a, 34b is arranged (for better visibility only some of the air flow openings 34a, 34b are designated by a reference number). Each of the air flow openings 34a, 34b is adapted to seize at least a portion of the sheet material 12.

As can be seen from FIGS. 5 and 6, only the air flow openings 34a associated with the layout 22, i.e. with one or more blanks 20 of the layout 22, are open. The remaining air flow openings 34b are closed because they are covered with a mask 36. In doing so, the mask 36 does not interfere with the air flow openings 34a associated with the layout 22.

Consequently, the vacuum gripper 26 is adapted to the geometry of the layout 22 in that in can only seize the blanks 20, when positioned above the sheet material 12. Waste 28 is not gripped by the vacuum gripper 26. Therefore, such a vacuum gripper 26 is well suited for separating a layout 22 from waste 28.

As can best be seen from FIG. 6, the array of air flow openings 34a, 34b covers a predefined maximum format of sheet material 12 to be manipulated by the vacuum gripper 26.

The array of air flow openings 34a, 34b is small meshed when compared to the geometry of the layout 22 to be recovered. Therefore, by adapting the mask 36 to the geometry of the layout 22, the vacuum gripper is suitable for recovering a very large variety of different types of layout 22.

A further embodiment of the vacuum gripper 26 is shown in FIG. 7. In this embodiment, the vacuum gripper 26 is magnetic, more specifically a magnetic cover 38 is attached to the gripping side of the vacuum gripper 26, e.g. by gluing.

The mask 36 is now positioned between the magnetic cover 38 and a magnetic sheet 40 and thereby securely attached to the vacuum gripper 26.

The mask 36 is made from non-magnetic material and therefore can be easily exchanged by separating the magnetic sheet 40 from the vacuum gripper 26 and positioning a different mask 36 on the magnetic cover 38.

As can be seen from the figures, an array of holes is provided both on the magnetic cover 38 and the magnetic sheet 40. These arrays of holes corresponds to the array of air flow openings 34a, 34b. Consequently, neither the magnetic cover 38 nor the magnetic sheet 40 is able to block or obstruct the air flow openings 34a, 34b. Therefore, when adapting the vacuum gripper 26 to a different geometry of the layout 22, it is not necessary to exchange or adapt the magnetic cover 38 or the magnetic sheet 40.

Apart from these structural differences the functionality of the vacuum gripper 26 according to the second embodiment is not different from the vacuum gripper 26 explained with reference to FIGS. 5 and 6.

The invention claimed is:

1. A gripper assembly for recovering a layout from a sheet material, the gripper assembly comprising:
   a flat conveyor unit for providing the sheet material, wherein the conveyor unit is equipped with a vacuum system for holding the sheet material on the conveyor unit with a first vacuum force; and
   a vacuum gripper being adapted for interacting with sheet material provided by the conveyor unit, the vacuum gripper comprising a gripper body with a flat surface through which an array of air flow openings is arranged, each air flow opening being adapted to seize at least a portion of the sheet material by applying a second vacuum force thereto,
   wherein, among the array of air flow openings, air flow openings associated with one or more blanks of the layout are selectively open, and air flow openings associated with waste of the sheet material are selectively closed,
   the first vacuum force applied to the one or more blanks by the vacuum system is smaller than the second vacuum force applied to the one or more blanks by the vacuum gripper simultaneously with the first vacuum force,
   the array of air flow openings is arranged on a gripping side of the gripper body, wherein the gripping side is equipped with a mask, which selectively covers air flow openings being associated with waste and selectively does not interfere with the air flow openings associated with the one or more blanks of the layout, and
   the gripping side of the vacuum gripper is magnetic, and wherein a magnetic cover is attached to the gripping side of the vacuum gripper.

2. The gripper assembly according to claim 1, wherein the array of air flow openings covers a predefined maximum format of the sheet material to be manipulated by the vacuum gripper.

3. The gripper assembly according to claim 1, wherein the mask is positioned between the magnetic side of the vacuum gripper and a magnetic sheet covering the mask on a side opposing the vacuum gripper.

4. The gripper assembly according to claim 1, wherein the conveyor unit further comprises a plurality of suction openings which are fluidically connected to the vacuum system such that the sheet material may be held on the conveyor unit by sucking air through the suction openings by the vacuum system, and wherein a configuration of the suction openings is independent from a size and/or shape of the sheet material to be processed.

5. An apparatus for recovering a layout from a sheet material, the apparatus comprising:
   the gripper assembly according to claim 1, wherein the sheet material comprising the layout and waste is to be provided by the conveyor unit of the gripper assembly, and wherein the vacuum gripper of the gripper assembly is connected to a manipulation unit, and
   a layout storage unit on which the one or more blanks of the layout recovered from the sheet material may be positioned.

6. The apparatus according to claim 5, wherein the vacuum gripper includes a plurality of vacuum grippers, each connected to a respective manipulation unit.

7. The apparatus according to claim 6, wherein at least one of the manipulation units comprises an industrial robot, which is adapted to manipulate the respective vacuum gripper within a predefined scope of motion.

8. The apparatus according to claim 5, wherein the layout storage unit is a stacking unit.

9. A method for separating a layout from waste of a sheet material, the method comprising:
   providing a sheet material on a conveyor unit, wherein the sheet material comprises a layout with one or more blanks and waste, and wherein the sheet material is held on the conveyor unit by a vacuum system of the conveyor unit,
   seizing the one or more blanks with the vacuum gripper of the gripper assembly according to claim 1, while not interacting with waste, and
   separating the seized one or more blanks from the waste.

10. The method according to claim 9, further comprising: moving the separated blanks to a blank storage unit.

11. The method according to claim 9, wherein the seizing includes positioning the vacuum gripper over the sheet material, wherein the vacuum gripper selectively seizes the one or more blanks without cooperating with the waste.

12. A gripper assembly for recovering a layout from a sheet material, the sheet material being divided between the layout and a waste portion, the gripper assembly comprising:
   a conveyor unit for providing the sheet material, wherein the conveyor unit is equipped with a vacuum system for holding the sheet material on the conveyor unit, the conveyor unit comprising a plurality of suction openings for the sheet material; and
   a vacuum gripper being adapted for interacting with sheet material provided by the conveyor unit, the vacuum gripper comprising a gripper body on which an array of air flow openings is arranged, each air flow opening being adapted to seize at least a portion of the sheet material by applying a vacuum force thereto,
   wherein, among the array of air flow openings, air flow openings associated with one or more blanks of the layout are selectively open while air flow openings associated with the waste portion of the sheet material are selectively closed,
   a magnetic gripping side of the gripper body is equipped with a mask that selectively covers air flow openings associated with waste and selectively does not interfere with the air flow openings associated with the one or more blanks of the layout, and a magnetic cover is attached to the magnetic gripping side of the gripper body, and
   the mask is positioned between the magnetic gripping side of the gripper body and a magnetic sheet covering the mask on a side opposing the gripper body.

13. The gripper assembly of claim 12, wherein the vacuum system of the conveyor applies a vacuum force to an entire sheet material including the layout and the waste, and the vacuum gripper applies a vacuum force to only the layout.

14. The gripper assembly of claim 13, wherein the array of air flow openings covers a predefined maximum format of the sheet material to be manipulated by the vacuum gripper.

15. A gripper assembly for recovering a layout from a sheet material, the gripper assembly comprising:
   a conveyor unit for providing the sheet material, wherein the conveyor unit is equipped with a vacuum system for holding the sheet material on the conveyor unit;
   a first vacuum gripper being adapted for interacting with the sheet material provided by the conveyor unit, the first vacuum gripper comprising a first gripper body on which a first array of air flow openings is arranged, each air flow opening of the first array being adapted to seize at least a first portion of the sheet material by applying a vacuum force thereto, wherein, among the first array of air flow openings, air flow openings associated with one or more blanks of the layout are selectively open while air flow openings associated with waste of the sheet material are selectively closed; and a second vacuum gripper being adapted for interacting with the sheet material provided by the conveyor unit, the second vacuum gripper comprising a second gripper body on which a second array of air flow openings is arranged, each air flow opening of the second array being adapted to seize at least a second portion of the sheet material by applying a vacuum force thereto, wherein, among the second array of air flow openings, air flow openings associated with one or more blanks of the layout are selectively open while air flow openings associated with waste of the sheet material are selectively closed.

16. The gripper assembly of claim 15, wherein the first vacuum gripper and the second vacuum gripper are connected to and moved by separate manipulation units.

17. The gripper assembly of claim 16, wherein the first vacuum gripper grips a first portion of the layout, and the second vacuum gripper grips a second portion of the layout.

18. The gripper assembly of claim 17, wherein the vacuum system of the conveyor applies a vacuum force to an entire sheet material including the layout and the waste, and the first and second vacuum grippers apply a vacuum force to only the layout.

* * * * *